United States Patent
Stancu et al.

(10) Patent No.: US 8,390,240 B2
(45) Date of Patent: Mar. 5, 2013

(54) ABSOLUTE POSITION SENSOR FOR FIELD-ORIENTED CONTROL OF AN INDUCTION MOTOR

(75) Inventors: Constantin C. Stancu, Anaheim, CA (US); Silva Hiti, Redondo Beach, CA (US); Robert T. Dawsey, Torrance, CA (US); Erik Hatch, Cypress, CA (US); Matthew D. Laba, Oakland, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 690 days.

(21) Appl. No.: 12/137,340

(22) Filed: Jun. 11, 2008

(65) Prior Publication Data

US 2009/0039825 A1    Feb. 12, 2009

Related U.S. Application Data

(60) Provisional application No. 60/954,096, filed on Aug. 6, 2007.

(51) Int. Cl.
  *H02P 23/00* (2006.01)
(52) U.S. Cl. ......... 318/799; 318/727; 318/772; 318/823
(58) Field of Classification Search .................. 318/727, 318/767, 772, 773, 778, 779, 798, 799, 822, 318/823, 825
  See application file for complete search history.

(56) References Cited

U.S. PATENT DOCUMENTS

| | | | | |
|---|---|---|---|---|
| 3,710,223 | A | * | 1/1973 | Cottrell .......................... 318/661 |
| 4,962,976 | A | * | 10/1990 | Takahashi et al. ............. 318/811 |
| 4,972,332 | A | | 11/1990 | Luebbering et al. |
| 5,077,507 | A | * | 12/1991 | Mitani et al. .................. 318/569 |
| 5,298,847 | A | * | 3/1994 | Kerkman et al. .............. 318/800 |
| 5,329,217 | A | * | 7/1994 | Kerkman et al. .............. 318/811 |
| 5,925,953 | A | * | 7/1999 | Shibata .......................... 310/83 |

(Continued)

FOREIGN PATENT DOCUMENTS

| CN | 1517683 A | 8/2004 |
|---|---|---|
| DE | 69709033 T2 | 8/2002 |

(Continued)

OTHER PUBLICATIONS

Fishbane et al. "Physics for Scientists and Engineers", second edition, Prentice Hall Publishing, NJ 07458. 1996. ISBN 0-13-231150-X, pp. 28-31, 67, 236 and 237. These pages show how to calculate velocity.*

(Continued)

*Primary Examiner* — Walter Benson
*Assistant Examiner* — Thai Dinh
(74) *Attorney, Agent, or Firm* — Ingrassia Fisher & Lorenz, P.C.

(57) ABSTRACT

Systems and methods are provided for an automotive drive system using an absolute position sensor for field-oriented control of an induction motor. An automotive drive system comprises an induction motor having a rotor, and a position sensor coupled to the induction motor. The position sensor is configured to sense an absolute angular position of the rotor. A processor may be coupled to the position sensor and configured to determine a relative angular position of the rotor based on a difference between the absolute angular position and an initial angular position obtained when the induction motor is started. A controller may be coupled to the induction motor and the processor and configured to provide field-oriented control of the induction motor based on the relative angular position of the rotor.

20 Claims, 4 Drawing Sheets

U.S. PATENT DOCUMENTS

| | | | |
|---|---|---|---|
| 5,965,995 A * | 10/1999 | Seibel et al. | 318/805 |
| 6,087,829 A | 7/2000 | Jager | |
| 6,222,335 B1 * | 4/2001 | Hiti et al. | 318/432 |
| 6,255,794 B1 * | 7/2001 | Staebler | 318/605 |
| 6,278,195 B1 | 8/2001 | Yamaguchi et al. | |
| 6,329,781 B1 * | 12/2001 | Matsui et al. | 318/717 |
| 6,373,219 B1 * | 4/2002 | Obara et al. | 318/801 |
| 6,483,270 B1 | 11/2002 | Miyazaki | |
| 6,674,261 B2 | 1/2004 | Takahashi | |
| 6,674,262 B2 * | 1/2004 | Kitajima et al. | 318/722 |
| 6,832,148 B1 | 12/2004 | Bennett | |
| 6,834,244 B2 * | 12/2004 | Kim | 702/72 |
| 6,850,033 B1 * | 2/2005 | Gallegos-Lopez et al. | 318/807 |
| 6,868,318 B1 | 3/2005 | Cawthorne | |
| 6,894,454 B2 | 5/2005 | Patel | |
| 6,927,551 B2 * | 8/2005 | Yoshimoto | 318/715 |
| 6,946,808 B2 | 9/2005 | Kandori | |
| 6,984,954 B2 | 1/2006 | Leonardi | |
| 7,002,318 B1 | 2/2006 | Schulz et al. | |
| 7,064,504 B2 | 6/2006 | Imai | |
| 7,154,236 B1 | 12/2006 | Heap | |
| 7,263,452 B2 * | 8/2007 | Kawamura | 702/95 |
| 7,307,415 B2 | 12/2007 | Seger et al. | |
| 7,881,567 B2 | 2/2011 | Bosselmann et al. | |
| 7,999,496 B2 | 8/2011 | Gleason et al. | |
| 8,179,127 B2 | 5/2012 | West et al. | |
| 2002/0030488 A1 * | 3/2002 | Ito | 324/207.25 |
| 2002/0172509 A1 | 11/2002 | Kameya et al. | |
| 2003/0218458 A1 | 11/2003 | Seger et al. | |
| 2004/0150359 A1 | 8/2004 | Yaguchi et al. | |
| 2005/0007044 A1 | 1/2005 | Qiu | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0206253 A1 | 9/2005 | Hertz | |
| 2005/0216225 A1 | 9/2005 | Anghel | |
| 2005/0248307 A1 * | 11/2005 | Okado | 318/799 |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2005/0280320 A1 | 12/2005 | Utsumi | |
| 2006/0125439 A1 | 6/2006 | Ajima et al. | |
| 2006/0194670 A1 | 8/2006 | Heap | |
| 2006/0250124 A1 | 11/2006 | Ether et al. | |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Aettel et al. | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |

| | | |
|---|---|---|
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2010/0014072 A1 | 1/2010 | Bosselmann et al. |
| 2011/0282552 A1 | 11/2011 | Gebregergis et al. |

FOREIGN PATENT DOCUMENTS

| | | |
|---|---|---|
| EP | 0839683 A2 | 5/1998 |
| JP | 2002323911 A * | 11/2002 |

OTHER PUBLICATIONS

Chinese Office Action dated Oct. 27, 2010, for Application No. 200810146006.4.

German Office Action dated Jul. 8, 2011 for German Patent Application No. 10 2008 036 013.9.

Chinese Office Action, dated Sep. 7, 2011, for Chinese Patent Application No. 200810146006.4.

AKSYS Corp; Pancake Resolvers Handbook; 2005; Axsys Technologies Inc; San Diego, CA; www.axsys.com Restriction Requirement, dated Jan. 26, 2011, issued in U.S. Appl. No. 12/245,790.

Response to Restriction Requirement, dated Feb. 24, 2011, filed in U.S. Appl. No. 12/245,790.

Restriction Requirement, dated May 13, 2011, issused in U.S. Appl. No. 12/245,790.

Response to Restriction Requirement, dated Jun. 13, 2011, filed in U.S. Appl. No. 12/245,790.

U.S. Office Action, dated Aug. 11, 2011, issued in U.S. Appl. No. 12/245,790.

Response to Office Action, dated Nov. 7, 2011, filed in U.S. Appl. No. 12/245,790.

Notice of Allowance, dated Jan. 18, 2012, issued in U.S. Appl. No. 12/245,790.

* cited by examiner

ABSOLUTE POSITION SENSOR FOR FIELD-ORIENTED CONTROL OF AN INDUCTION MOTOR

CROSS-REFERENCE TO RELATED APPLICATION(S)

This application claims the benefit of U.S. provisional patent application Ser. No. 60/954,096, filed Aug. 6, 2007, and incorporated by reference herein.

TECHNICAL FIELD

Embodiments of the subject matter described herein relate generally to vehicle drive systems, and more particularly, embodiments of the subject matter relate to absolute position sensing for field-oriented control of induction motors.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles. Many of these vehicles use electric motors to provide traction power to the vehicle.

For induction motors, the speed of the rotor and the speed of the rotating magnetic field in the stator must be different, a concept known as slip, in order to induce current. In order to operate the induction motor at its highest efficiency, the slip is controlled using feedback control loops. In conventional control systems, as the rotor speed increases, the rotor approaches a base speed (or rated speed), where the voltage across the motor terminals reaches a value at which no more current can be provided to the motor. In order to operate the motor at higher speeds than the base speed, a technique known as flux weakening, controlled by non-torque generating current is employed.

Accordingly, field-oriented control methods have been developed to control the torque generating current supplied to the induction motor separately from the non-torque generating current. These methods use the relative position and speed of the rotor to maintain a desired relationship between the stator flux and rotor flux. The non-torque generating current is adjusted based on the speed of the rotor and the flux characteristics of the induction motor. By compensating for the undesired flux, field-oriented control can be used to improve efficiency, the motor transient response, and tracking of the torque command at speeds higher than the base speed. As a result of the improved performance, induction motors and drive systems may be appropriately sized for an application, thereby lowering cost and improving overall efficiency.

Most field-oriented control methods for induction motors utilize incremental encoders to measure the relative position and speed of the rotor. Typically, these encoders are either magnetic or optical. For automotive environments, packaging space is often at a premium and the encoders are often exposed to demanding environmental conditions. For example, the operating temperature may range from −40° C. to 150° C., which exceeds the operating temperature ratings for most optical encoders. While magnetic encoders may be able to tolerate automotive temperatures, they often cannot sustain operation when exposed to vibration forces and frequencies encountered in automotive applications. Furthermore, in order to achieve high-levels of accuracy, magnetic encoders must be implemented in a large physical size, which is undesirable from a packaging and automotive design perspective.

BRIEF SUMMARY

An apparatus is provided for an automotive drive system. The automotive drive system comprises an induction motor having a rotor, and a position sensor coupled to the induction motor. The position sensor is configured to sense the absolute angular position of the rotor. A processor may be coupled to the position sensor and configured to determine the relative angular position of the rotor based on a difference between the absolute angular position and an initial angular position obtained when the induction motor is started. A controller may be coupled to the induction motor and the processor and configured to provide field-oriented control of the induction motor based on the relative angular position of the rotor.

An apparatus is provided for a drive system for use in a vehicle. The drive system comprises an induction motor having a rotor, and a position sensor integrated with the induction motor. The position sensor is configured to sense the absolute angular position of the rotor. The position sensor may further comprise a resolver having a resolver rotor coupled to a shaft of the induction motor, and a resolver stator coupled to the induction motor.

A method is provided for controlling an induction motor. The method comprises obtaining an initial angular position of the rotor using an absolute position sensor, wherein the initial angular position of the rotor is obtained when the induction motor is started. The method further comprises obtaining a subsequent angular position of the rotor using the absolute position sensor. The method comprises determining a relative angular position of the rotor based on the initial angular position and the subsequent angular position, and determining a magnetizing current command based on the relative angular position.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
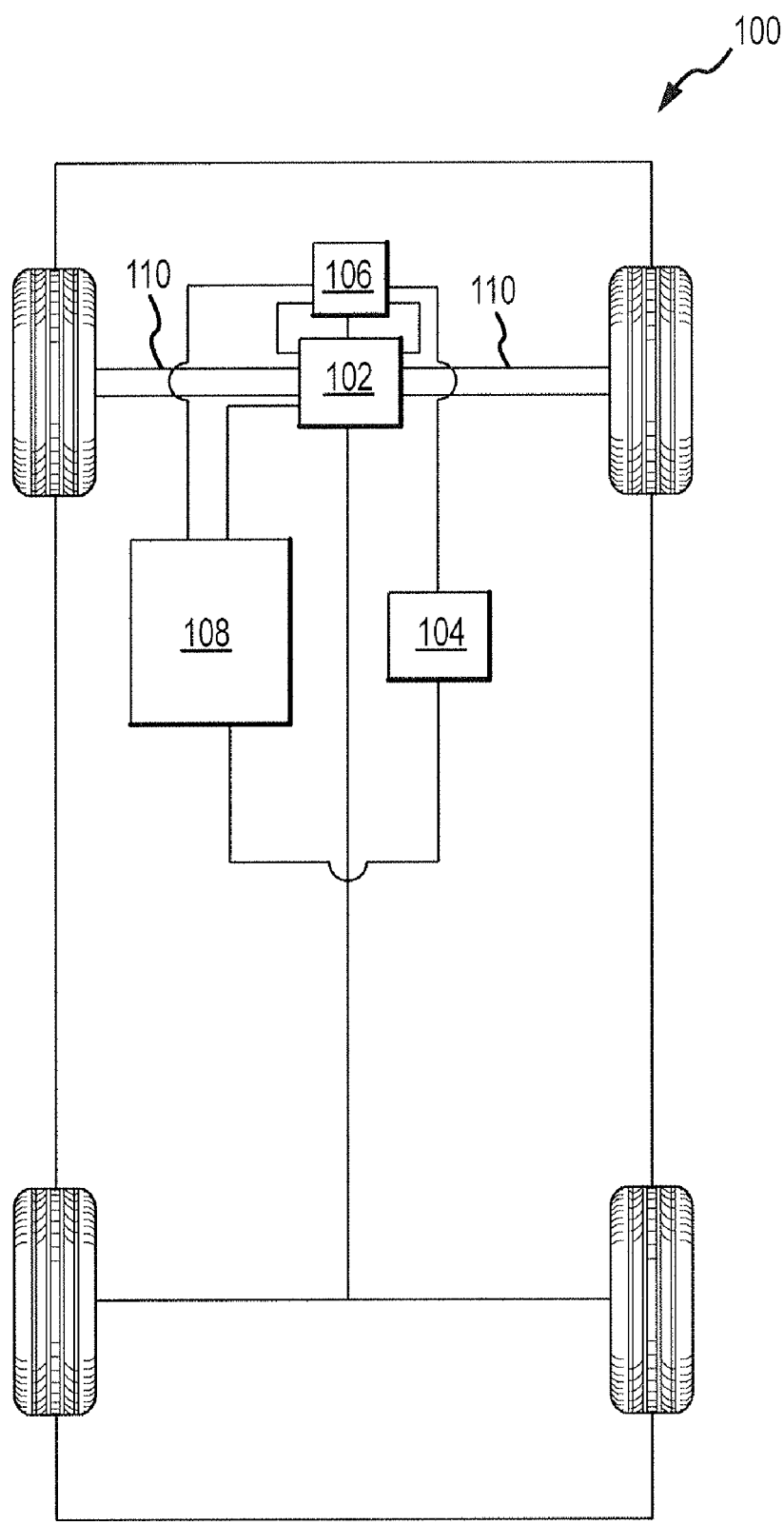
FIG. 1 is a block diagram of an exemplary automobile in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. Furthermore, the terms "first", "second" and other such numerical terms referring to structures do not imply a sequence or order unless clearly indicated by the context.

For the sake of brevity, conventional techniques related to signaling, sensors, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems and methods for implementing field-oriented control of induction motors using absolute position sensors. Field-oriented control involves separate current control loops for the torque generating current and the non-torque generating current supplied to the induction motor. The relative position and speed of the rotor is used to maintain a desired relationship between the stator flux and rotor flux to improve motor efficiency, as described in greater detail below. As used herein, subscripts d and q are quantities in the Cartesian frame of reference synchronous with the rotation of a rotor within an induction motor, where the q axis (or quadrature axis) is orthogonal to the rotor pole axis (i.e., torque generating) and the d axis (or direct axis) is parallel to the rotor pole axis (i.e., non-torque generating).

FIG. 1 illustrates a vehicle, or automobile 100, in accordance with one embodiment, which includes an induction motor 102, an energy source 104, an inverter assembly 106, an electronic control system 108, and a drive shaft 110. In an exemplary embodiment, the energy source 104 is in operable communication and/or electrically coupled to the electronic control system 108 and the inverter assembly 106. The inverter assembly 106 is coupled to the induction motor 102, which in turn is coupled to the drive shaft 110. The inverter assembly 106 is in operable communication and/or electrically coupled to the electronic control system 108 and is configured to provide electrical energy and/or power from the energy source 104 to the induction motor 102 as discussed in greater detail below.

Depending on the embodiment, the automobile 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 100 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a fuel cell vehicle engine, a gaseous compound (e.g., hydrogen and natural gas) fueled engine, a combustion/electric motor hybrid engine, or an electric motor.

In the exemplary embodiment illustrated in FIG. 1, the induction motor 102 may comprise a generator, a traction motor, or another suitable motor known in the art. In an exemplary embodiment, the induction motor 102 is a multi-phase alternating current (AC) motor and includes a set of windings (or coils), wherein each winding corresponds to one phase of the induction motor 102. Although not illustrated in FIG. 1, the induction motor 102 includes a stator assembly (or stator), and a rotor assembly (or rotor), as will be appreciated by one skilled in the art. In an exemplary embodiment, the induction motor 102 may also include a transmission integrated therein such that the induction motor 102 and the transmission are mechanically coupled to at least some of the wheels through one or more drive shafts 110.

Depending on the embodiment, the energy source 104 may comprise a battery, a fuel cell, or another suitable voltage source. It should be understood that although FIG. 1 depicts an automobile 100 having one energy source 104, the principles and subject matter discussed herein are independent of the number or type of energy source, and apply to vehicles having any number of energy sources.

In an exemplary embodiment, the inverter assembly 106 includes one or more inverters, each including switches (e.g., semiconductor devices, such as transistors and/or switches) with antiparallel diodes (i.e., antiparallel to each switch), with windings of the induction motor 102 electrically connected between the switches to provide voltage and create torque in the induction motor 102, as will be understood in the art. The electronic control system 108 is in operable communication and/or electrically connected to the inverter assembly 106. Although not shown in detail, the electronic control system 108 includes various sensors and automotive control modules, or electronic control units (ECUs), such as an inverter control module for controlling the inverter assembly 106, and may further include a processor and/or a memory which includes instructions stored thereon (or in another computer-readable medium) for carrying out the processes and methods as described below.

In accordance with one embodiment, the electronic control system 108 is responsive to commands received from the driver of the automobile 100 (i.e. via an accelerator pedal) and provides commands to the inverter assembly 106 to utilize high frequency pulse width modulation (PWM) to manage the voltage provided to the induction motor 102 by the inverter assembly 106, as will be understood. In an exemplary embodiment, the electronic control system 108 implements a field-oriented control loop to operate the inverter assembly 106 and improve the efficiency and performance of the induction motor 102, as described in greater detail below.

Figure 2:
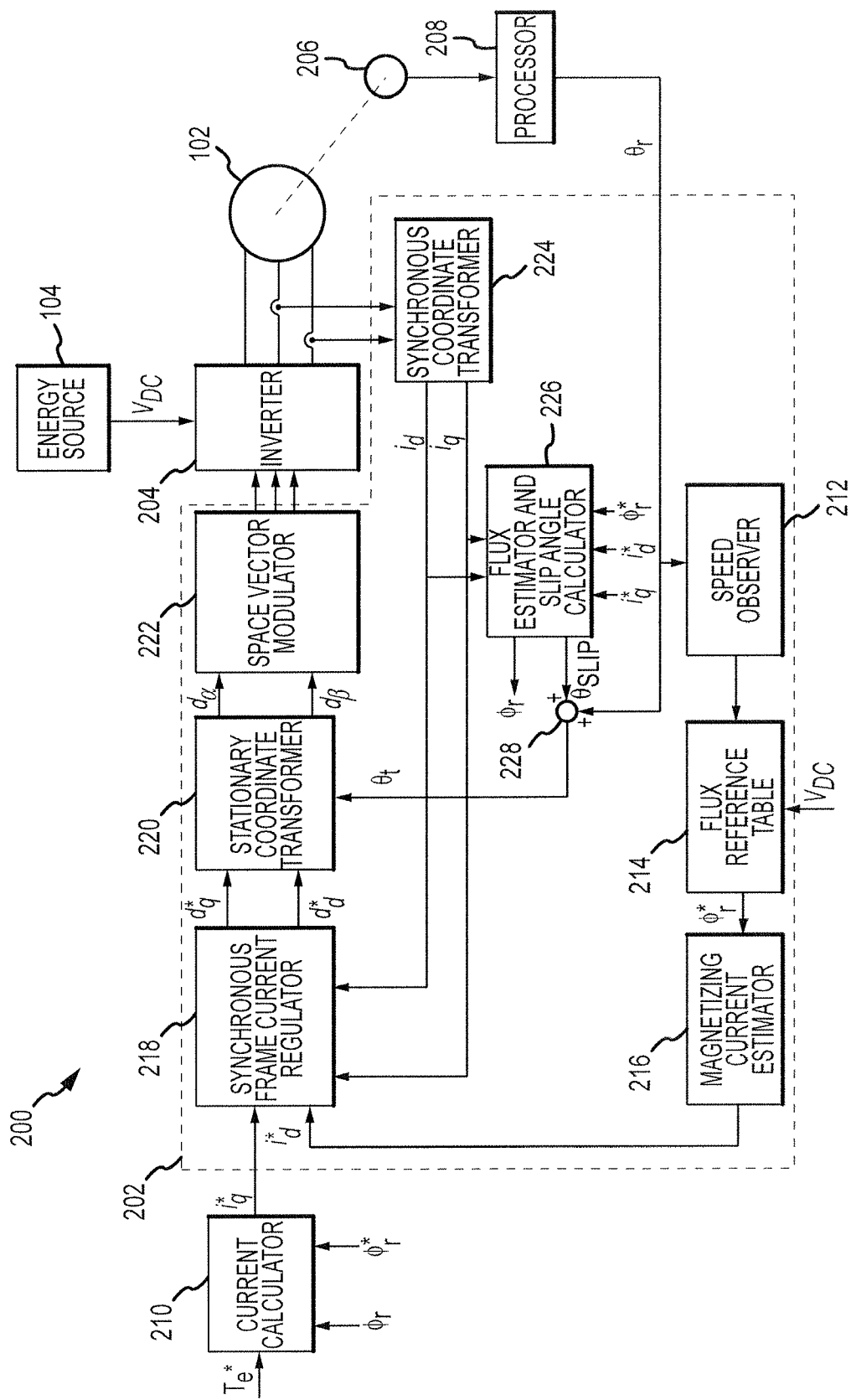
FIG. 2 is a block diagram of an exemplary embodiment of an induction motor control system suitable for use in the automobile of FIG. 1.

Referring now to FIG. 2, in an exemplary embodiment, an induction motor control system 200 includes, without limitation, an induction motor 102, an energy source 104, a controller 202, an inverter 204, an absolute position sensor 206, and a processor 208. Some elements of FIG. 2 are similar to their counterpart elements described above in reference to FIG. 1, and such description will not be redundantly repeated in the context of FIG. 2. The induction motor control system 200 may be configured to utilize field-oriented control to regulate the induction motor 102 based on the rotor position, as described in greater detail below. For example, the induction motor control system 200 may be configured to implement field-oriented control methods, such as those disclosed in U.S. Pat. No. 6,222,335 entitled "METHOD OF CONTROLLING A VOLTAGE-FED INDUCTION MACHINE", assigned to the assignee of the present invention and incorporated by reference herein, which discloses an exemplary method for implementing field-oriented control based on relative position of a rotor for an induction motor.

Referring again to FIG. 2, in an exemplary embodiment, the energy source 104 is coupled to the inverter 204, which in turn is coupled to the induction motor 102. The absolute position sensor 206 is coupled to the induction motor 102. The processor 208 is coupled between the output of the absolute position sensor 206 and the controller 202. The controller 202 is coupled to the inverter 204, and is configured to provide duty cycle commands to the inverter 204. In an exemplary embodiment, the controller 202 is further coupled to the output of the inverter 204 and the output of the processor 208 to create a feedback control loop for implementing field-oriented control as discussed in greater detail below. The three lines between the inverter 204 and the induction motor 102 indicate that the induction motor 102 and the inverter 204 have three phases, although the subject matter described herein is not limited to a three-phase implementation, and applies to inverters 204 and induction motors 102 having any number of phases, as will be appreciated in the art.

In an exemplary embodiment, the absolute position sensor 206 provides information or signals representative of the absolute angular position of the rotor. The absolute position sensor 206 may be configured to sense or measure the absolute angular position of the rotor of the induction motor 102 relative to the stator or some other fixed reference point based on the positioning of the absolute position sensor 206. In an exemplary embodiment, the absolute position sensor 206 is a resolver, although other suitable means for sensing absolute angular position may be used in alternative embodiments. In an exemplary embodiment, a resolver having two pole pairs (e.g., two-pole resolver) is used. In alternative embodiments, multipole resolvers may be used, however, multipole resolvers are generally more costly and require additional mathematical computations to be implemented, which are known in the art and beyond the scope of this disclosure. The resolver is capable of producing accurate position information even while being packaged and designed for compact size. Additionally, resolvers are highly durable and can sustain reliable and accurate operation in the presence of demanding environmental conditions (e.g., automotive temperature and vibration levels).

In an exemplary embodiment, the processor 208 is coupled to the absolute position sensor 206 and is configured to convert the signals (analog signals in the case of a resolver) or measurements from the absolute position sensor 206 to a digital representation (e.g., digital word). The processor 208 may be a resolver-to-digital converter or another suitable means for processing signals from the absolute position sensor 206. The processor 208 may be configured to perform additional tasks and functions, as described in greater detail below.

In an exemplary embodiment, the induction motor control system 200 may further include a current calculator 210. In an exemplary embodiment, the output of the current calculator 210 is coupled to an input of the controller 202, and the current calculator 210 is configured to provide a torque producing current command ($i_q^*$) to the controller 202. The current calculator 210 may determine the torque producing current command in response to a torque command ($T_e^*$) (e.g., provided by the electronic control system 108), an estimated rotor flux ($\Phi_r$), and a commanded rotor flux ($\Phi_r^*$), as described in greater detail below.

In an exemplary embodiment, the controller 202 is configured to control the voltage provided by the energy source 104 to the induction motor 102 by utilizing PWM techniques to regulate the output of the inverter 204, as will be understood. The controller 202 is configured to utilize information regarding the relative position of the rotor of the induction motor 102 to implement field-oriented control. In an exemplary embodiment, the controller 202 may further include, without limitation, a speed observer 212, a flux reference table 214, a magnetizing current estimator 216, a synchronous frame current regulator 218, a stationary coordinate transformer 220, a space vector modulator 222, a synchronous coordinate transformer 224, a flux estimator and slip angle calculator 226, and an adder 228. These and other elements may be coupled together to implement field-oriented control of the induction motor 102 based on the relative rotor position, as described in greater detail below.

Figure 3:
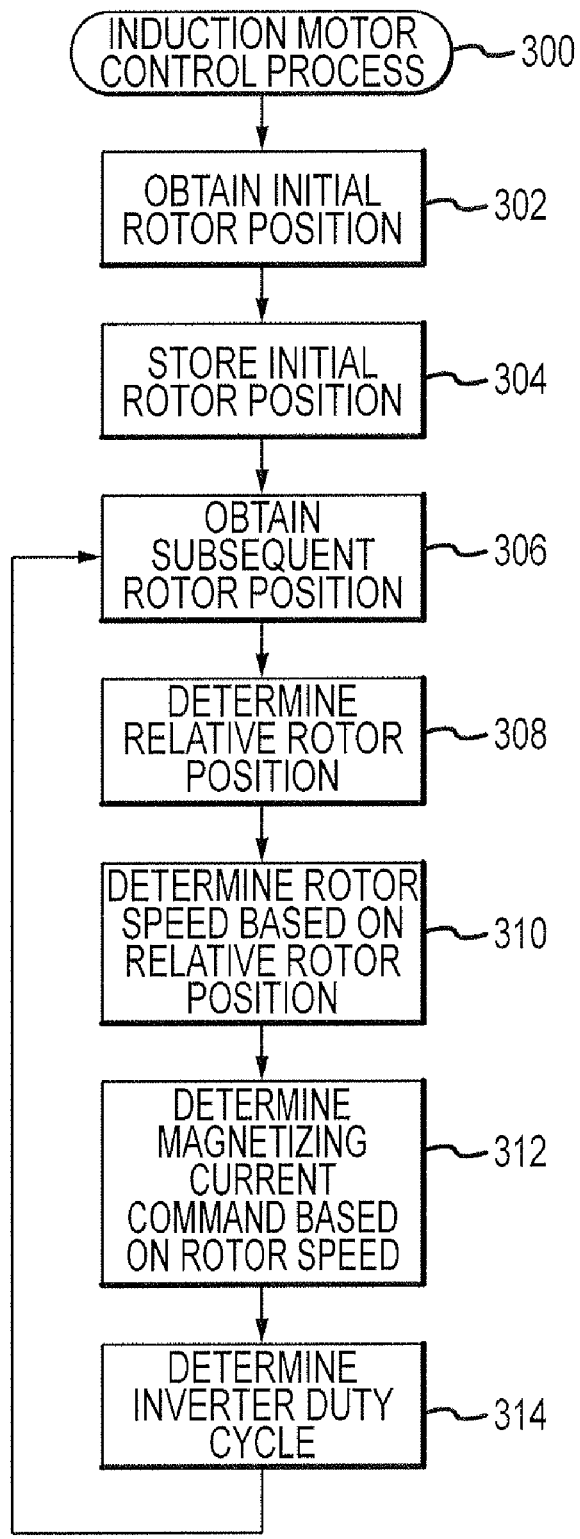
FIG. 3 is a flow diagram of an exemplary induction motor control process suitable for use in the induction motor control system of FIG. 2.

Referring now to FIG. 3, in an exemplary embodiment, the induction motor control system 200 may be configured to perform an induction motor control process 300 and additional tasks, functions, and operations described below. The various tasks may be performed by software, hardware, firmware, or any combination thereof. For illustrative purposes, the following description may refer to elements mentioned above in connection with FIGS. 1-2. In practice, the tasks, functions, and operations may be performed by different elements of the described system, such as the electronic control system 108, controller 202 or the processor 208. It should be appreciated any number of additional or alternative tasks may be included, and may be incorporated into a more comprehensive procedure or process having additional functionality not described in detail herein.

Referring again to FIG. 3, and with continued reference to FIG. 1 and FIG. 2, in an exemplary embodiment, the induction motor control process 300 may be configured to initialize when the induction motor 102 is started. In an exemplary embodiment, the absolute position sensor 206 obtains an initial angular position of the rotor when the induction motor 102 is started (task 302). The induction motor control process 300 may be configured to store the initial angular position (task 304). For example, the processor 208 may be configured to store or maintain the initial angular position in memory. The absolute position sensor 206 obtains a subsequent angular position of the rotor during operation of the induction motor 102 as the rotor rotates (task 306).

In an exemplary embodiment, the induction motor control process 300 is configured to determine the relative angular position ($\theta_r$) of the rotor based on the absolute angular position (task 308). The induction motor control process 300 may determine a relative angular position of the rotor based on a difference between the subsequent angular position and the initial angular position. For example, the processor 208 may be configured to store the initial angular position of the rotor as an offset, and subtract the initial angular position from each subsequent angular position measurement to produce a relative angular position (e.g., relative to the initial angular position or angular position at startup). In alternative embodiments, the controller 202 may be configured to receive the absolute angular position and determine the relative angular position. In an exemplary embodiment, the induction motor control process 300 is configured to provide the relative angular position to a field-oriented control system (e.g., controller 202). For example, the output of the processor 208 may be coupled to an input of the controller 202.

In an exemplary embodiment, the induction motor control process 300 is configured to determine the speed of the rotor ($\omega_r$) based on the relative position (task 310). For example, the processor 208 may coupled to and/or provide the relative rotor position information to the speed observer 212. The speed observer 212 may be configured to determine the rotor speed by differentiating the relative rotor position with respect to time. In an exemplary embodiment, the induction motor control process 300 utilizes the rotor speed to determine a magnetizing current command ($i_d^*$) to compensate for transient changes in rotor flux based on the rotor speed (task 312). For example, the speed observer 212 may provide the rotor speed to the input of the flux reference table 214, which obtains a rotor flux command ($\Phi_r^*$) In accordance with one embodiment, the flux reference table 214 is a lookup table containing predetermined rotor flux commands ($\Phi_r^*$) based on the rotor speed ($\omega_r$), the voltage of the energy source 104 ($V_{DC}$), and the flux characteristics of the induction motor 102. The output of the flux reference table 214 may be provided to the magnetizing current estimator 216, which is configured to determine the magnetizing current command ($i_d^*$) to produce the desired rotor flux based on the rotor flux command ($\Phi_r^*$).

In an exemplary embodiment, the induction motor control process 300 is configured to determine a duty cycle for inverter 204 based on the relative position of the rotor and the synchronous frame current commands ($i_d^*, i_q^*$) (task 314). The synchronous frame current regulator 218 may be coupled to the current calculator 210 and the magnetizing current estimator 216, such that it receives the synchronous frame current commands ($i_d^*, i_q^*$). The synchronous frame current regulator 218 may be coupled to the output of the synchronous coordinate transformer 224. The synchronous coordinate transformer 224 is coupled to the output of the inverter 204 and configured to measure (or sense) the current in the induction motor 102. The synchronous coordinate transformer 224 performs a coordinate transformation to obtain the value of the measured currents in the synchronous reference frame ($i_d, i_q$) and provides the measured currents to the synchronous frame current regulator 218. The synchronous frame current regulator 218 is configured to determine synchronous frame duty cycles ($d_d^*, d_q^*$) such that the measured currents ($i_d, i_q$) track the current commands ($i_d^*, i_q^*$).

In an exemplary embodiment, the stationary coordinate transformer 220 is coupled to the output of the synchronous frame current regulator 218 and the output of the adder 228. The adder 228 is coupled to the flux estimator and slip angle calculator 226, which is configured to receive as inputs the measured current ($i_d, i_q$) commanded current ($i_d^*, i_q^*$), and the rotor flux command ($\Phi_r^*$) and from those inputs determine an estimated rotor flux ($\Phi_r$) and an optimized slip angle ($\theta_{slip}$), as will be appreciated in the art. The adder 228 is also configured to receive the relative rotor position ($\theta_r$) and add the relative rotor position and the slip angle ($\theta_{slip}$) to produce a transformation angle ($\theta_t$). In an exemplary embodiment, the stationary coordinate transformer 220 is configured to convert the synchronous frame duty cycle commands ($d_d^*, d_q^*$) to the stationary frame ($d_\alpha, d_\beta$) based on the transformation angle ($\theta_t$). In an exemplary embodiment, the output of the stationary coordinate transformer 220 is coupled to the input of the space vector modulator 222. The space vector modulator 222 is configured to determine operative duty cycle commands for the switches of the inverter 204 based on the stationary frame duty cycle commands, such that the inverter 204 utilizes PWM modulation to provide voltage from the energy source 104 to operate the induction motor 102 as desired. In an exemplary embodiment, the loop defined by task 306, task 308, task 310, task 312, and task 314 repeats indefinitely during operation of the induction motor 102.

Figure 4:
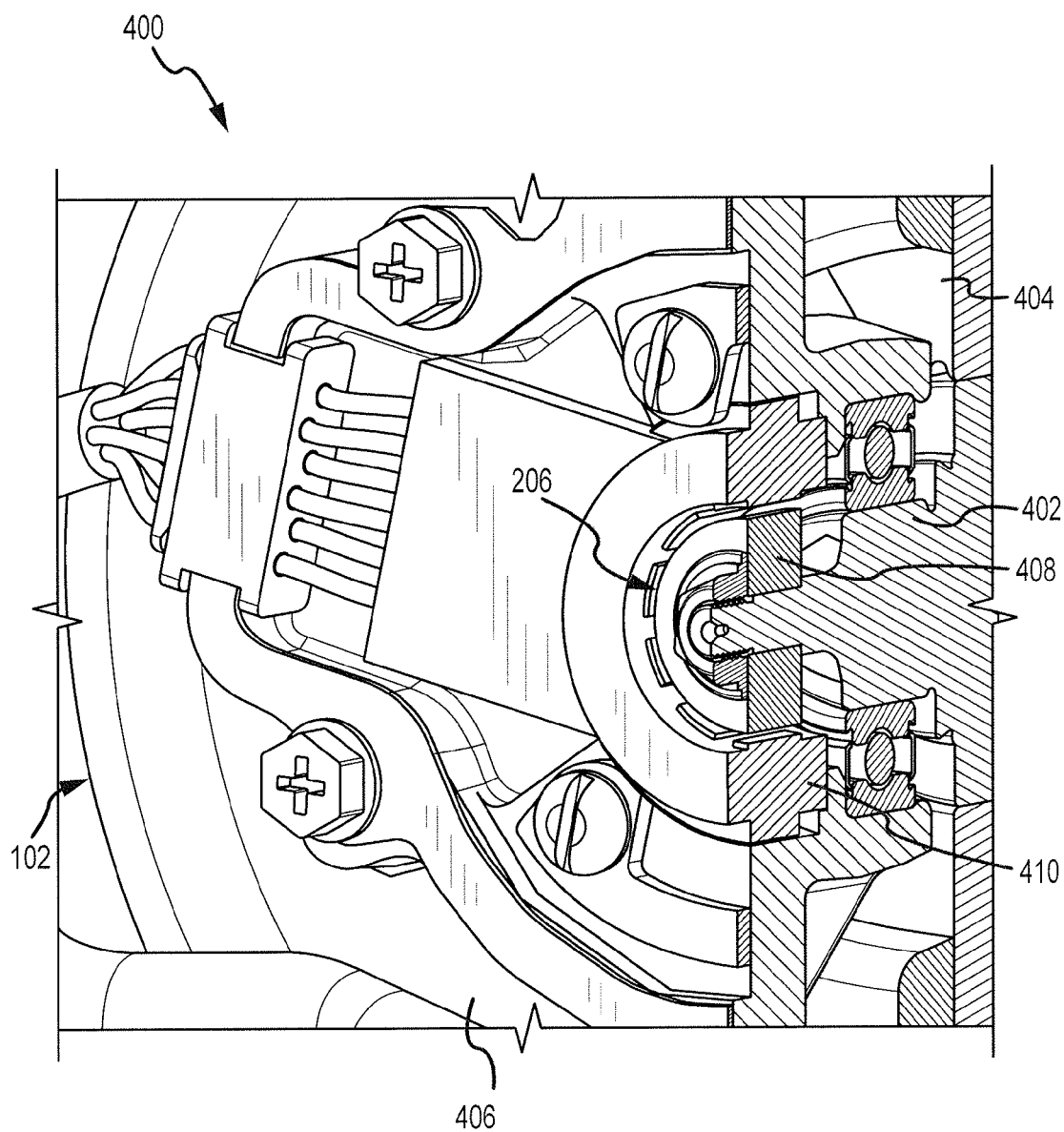
FIG. 4 is a cross-sectional view of an exemplary induction motor automotive drive system in accordance with one embodiment.

Referring now to FIG. 4, in an exemplary embodiment, an induction motor automotive drive system 400 includes, without limitation, an induction motor 102 integrated with an absolute position sensor 206. FIG. 4 illustrates a cross-sectional view of the induction motor drive system 400 taken down a center of a rotating shaft. The induction motor 102 comprises a shaft 402 concentric with a rotor 404 encased in a housing 406. In an exemplary embodiment, the absolute position sensor 206 is a resolver having a resolver rotor 408 and a resolver stator 410.

In an exemplary embodiment, the shaft 402 is mechanically coupled to the rotor 404, such that the shaft 402 rotates synchronously with the rotor 404. In an exemplary embodiment, the shaft 402 has length such that a portion of the shaft 402 extends beyond the rotor 404 and through a gap in the housing 406. The resolver rotor 408 is mechanically coupled to the shaft 402 (e.g., by bolting the resolver rotor 408 to the shaft 402). In an exemplary embodiment, the shaft 402 is concentric with the resolver rotor 408. The resolver stator 410 may be mechanically coupled to the housing 406 and concentric with the resolver rotor 408. The resolver stator 410 is configured to sense the absolute angular position of the rotor 404 based on the angular position of the resolver rotor 408, which tracks the angular position of the rotor 404 via the mechanical coupling to the shaft 402, as will be understood in the art.

The systems and/or methods described above provide a field-oriented control system for induction motors using absolute position sensors. Because field-oriented control systems for induction motors are designed for incremental or relative position measurements, implementing an absolute position sensor (such as a resolver) is more complex than using an incremental encoder. However, the space savings exceed the additional implementation costs. Additionally, resolvers are durable can be reliably used in demanding environments where incremental encoders are less reliable. As described above, the performance of the motor is not impaired and the field-oriented control of the induction motor may be achieved without modifying existing control systems, even though a relative position sensor is not used.

Other embodiments may utilize system and method described above in different types of automobiles, different vehicles (e.g., watercraft and aircraft), or in different electrical systems altogether, as it may be implemented in any situation where an induction motor is operated using field-oriented control. Further, the motor and the inverters may have different numbers of phases, and the systems described herein should not be construed as limited to a three-phase design. The basic principles discussed herein may be extended to higher-order phase systems as will be understood in the art.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive drive system comprising:
   an induction motor having a rotor;
   an absolute position sensor coupled to the induction motor, wherein the absolute position sensor is configured to sense an absolute angular position of the rotor; and
   a controller coupled to the absolute position sensor to add a slip angle to a relative angular position of the rotor to produce a transformation angle, wherein the relative angular position is determined based on the absolute angular position.

2. The automotive drive system of claim 1, further comprising a processor coupled to the absolute position sensor, the processor being configured to determine the relative angular position of the rotor based on a difference between the absolute angular position and an initial absolute angular position of the rotor, wherein the initial absolute angular position is obtained when the induction motor is started.

3. The automotive drive system of claim 2, wherein the controller is coupled to the induction motor and the processor, the controller being configured to provide field-oriented control of the induction motor based on the relative angular position of the rotor.

4. The automotive drive system of claim 3, wherein the controller includes a speed observer configured to determine a speed of the rotor based on the relative angular position.

5. The automotive drive system of claim 4, wherein the controller is configured to determine a magnetizing current command to produce a desired rotor flux based on the speed of the rotor.

6. The automotive drive system of claim 5, wherein the controller includes:
   a magnetizing current estimator to determine the magnetizing current command based on a rotor flux command obtained from a flux reference table based on the speed of the rotor; and
   a slip angle calculator to determine the slip angle based on measured currents in the induction motor, a torque producing current command, the magnetizing current command, and the rotor flux command.

7. The automotive drive system of claim 2, wherein the processor is configured to determine the relative angular position of the rotor by:
   storing the initial absolute angular position of the rotor; and
   subtracting the initial absolute angular position from a subsequent absolute angular position of the rotor, wherein subtracting the initial absolute angular position from the subsequent absolute angular position results in the relative angular position.

8. The automotive drive system of claim 1, wherein the absolute position sensor is a resolver and the automotive drive system further comprises a resolver-to-digital converter coupled to the resolver, the resolver-to-digital converter being configured to determine the relative angular position of the rotor based on the absolute angular position.

9. The automotive drive system of claim 1, wherein the controller includes:
   a stationary coordinate transformer to convert synchronous frame commands to stationary frame commands based on the transformation angle; and
   a space vector modulator coupled to the stationary coordinate transformer and the induction motor to operate the induction motor based on the stationary frame commands.

10. The automotive drive system of claim 1, wherein the controller includes a slip angle calculator to determine the slip angle based on measured currents in the induction motor, a torque producing current command, a magnetizing current command, and a rotor flux command.

11. A drive system for use in a vehicle, the drive system comprising:
    an induction motor having a rotor;
    a resolver integrated with the induction motor, wherein the resolver further comprises:
       a resolver rotor coupled to a shaft of the induction motor, wherein the resolver rotor is concentric to and integral with the shaft; and
       a resolver stator coupled to the induction motor, wherein the resolver stator is concentric to the resolver rotor;
    a resolver-to-digital converter coupled to the resolver stator, the resolver-to-digital converter being configured to convert signals from the resolver to a digital output representative of an absolute angular position of the rotor; and
    a controller coupled to the induction motor and the resolver-to-digital converter to determine a relative angular position of the rotor based on the absolute angular position of the rotor, determine a rotor speed based on the relative angular position, and determine a magnetizing current command to produce a desired rotor flux based on the rotor speed.

12. The drive system of claim 11, wherein the resolver is a two-pole resolver.

13. The drive system of claim 11, wherein the controller is configured to determine the relative angular position by:
    storing an initial absolute angular position of the rotor, the initial absolute angular position of the rotor being obtained when the induction motor is started; and
    subtracting the initial absolute angular position from the absolute angular position of the rotor, wherein subtracting the initial absolute angular position from the absolute angular position results in the relative angular position.

14. The drive system of claim 11, wherein the controller includes:
    a speed observer to determine the rotor speed based on the relative angular position;
    a flux reference table to provide a rotor flux command based on the speed of the rotor; and
    a magnetizing current estimator to determine the magnetizing current command based on the rotor flux command.

15. The drive system of claim 14, wherein the controller includes:
    a slip angle calculator to determine a slip angle based on measured currents in the induction motor, a torque producing current command, the magnetizing current command, and the rotor flux command;
    an adder to add the slip angle to the relative angular position to produce a transformation angle;
    a synchronous frame current regulator to determine synchronous frame duty cycle commands such that the measured currents in the induction motor track the torque producing current command and the magnetizing current command;
    a stationary coordinate transformer coupled to the synchronous frame current regulator and the adder to convert the synchronous frame duty cycle commands to stationary frame duty cycle commands based on the transformation angle; and a space vector modulator coupled to the stationary coordinate transformer and the induction motor to operate the induction motor based on the stationary frame duty cycle commands.

16. A method for controlling an induction motor having a rotor, the method comprising:
    obtaining an initial absolute angular position of the rotor using an absolute position sensor, wherein the initial absolute angular position of the rotor is obtained when the induction motor is started;
    obtaining a subsequent absolute angular position of the rotor using the absolute position sensor;
    determining a relative angular position of the rotor based on the initial absolute angular position and the subsequent absolute angular position; and
    determining a magnetizing current command to produce a desired rotor flux based on the relative angular position.

17. The method of claim 16, wherein determining the relative angular position further comprises subtracting the initial absolute angular position from the subsequent absolute angular position, wherein subtracting the initial absolute angular position from the subsequent absolute angular position results in the relative angular position of the rotor.

18. The method of claim 16, further comprising determining a rotor speed based on the relative angular position of the rotor by differentiating the relative angular position with respect to time.

19. The method of claim 16, further comprising determining a slip angle based at least in part on the magnetizing current command.

20. The method of claim 16, further comprising:
    determining synchronous frame commands based on the magnetizing current command and a torque producing current command;
    determining a rotor speed based on the relative angular position;
    obtaining a rotor flux command based on the rotor speed;
    determining a slip angle based on the magnetizing current command, the torque producing current command, the rotor flux command, and measured currents in the induction motor;
    adding a slip angle to the relative angular position to produce a transformation angle;
    converting the synchronous frame commands to stationary frame commands using the transformation angle; and
    operating the induction motor based on the stationary frame command, wherein determining the magnetizing current command comprises determining the magnetizing current command based on the rotor flux command.

* * * * *